United States Patent
Kodama et al.

(10) Patent No.: US 10,899,952 B2
(45) Date of Patent: Jan. 26, 2021

(54) AUTOMOTIVE ENGINE COOLANT COMPOSITION, AUTOMOTIVE ENGINE CONCENTRATED COOLANT COMPOSITION, AND METHOD OF OPERATING INTERNAL COMBUSTION ENGINE

(71) Applicants: TOYOTA JIDOSHA KABUSHIKI KAISHA, Toyota (JP); Shin-Etsu Chemical Co., Ltd., Tokyo (JP)

(72) Inventors: Yasuaki Kodama, Seto (JP); Tomoyuki Nakano, Fuji (JP); Takato Sakurai, Annaka (JP); Kazuhito Yaeda, Shizuoka (JP); Yoichiro Yoshii, Shizuoka (JP); Yosuke Kishino, Shizuoka (JP); Masayuki Nagasawa, Shizuoka (JP); Shogo Kamenoue, Wakayama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/311,049

(22) PCT Filed: Jun. 20, 2017

(86) PCT No.: PCT/IB2017/000760
§ 371 (c)(1),
(2) Date: Dec. 18, 2018

(87) PCT Pub. No.: WO2017/221061
PCT Pub. Date: Dec. 28, 2017

(65) Prior Publication Data
US 2019/0177591 A1    Jun. 13, 2019

(30) Foreign Application Priority Data

Jun. 24, 2016 (JP) ................. 2016-126060

(51) Int. Cl.
*C09K 5/00* (2006.01)
*C09K 5/10* (2006.01)
*C09K 5/20* (2006.01)

(52) U.S. Cl.
CPC . *C09K 5/10* (2013.01); *C09K 5/20* (2013.01)

(58) Field of Classification Search
CPC .............. C09K 5/00; C09K 5/10; C09K 5/20
USPC ........................................................ 252/73
See application file for complete search history.

(56) References Cited

U.S. PATENT DOCUMENTS

| 4,363,741 | A | * | 12/1982 | Gould | ...................... | C11D 1/72 |
| | | | | | | 134/3 |
| 4,794,139 | A | * | 12/1988 | Braden | ................. | C08F 220/06 |
| | | | | | | 524/117 |
| 6,512,015 | B1 | | 1/2003 | Elms et al. | | |
| 8,536,296 | B2 | | 9/2013 | Meyers et al. | | |
| 9,212,597 | B2 | | 12/2015 | Hirai et al. | | |
| 2004/0046147 | A1 | * | 3/2004 | Matsuda | ................ | C09K 5/063 |
| | | | | | | 252/70 |
| 2006/0054564 | A1 | | 3/2006 | Woyciesjes et al. | | |
| 2007/0241306 | A1 | * | 10/2007 | Wehner | .................... | A61Q 5/02 |
| | | | | | | 252/67 |
| 2009/0266519 | A1 | | 10/2009 | Marinho et al. | | |
| 2012/0270129 | A1 | | 10/2012 | Marinho et al. | | |
| 2016/0032209 | A1 | | 2/2016 | Kujak et al. | | |
| 2019/0031938 | A1 | | 1/2019 | Kodama et al. | | |

FOREIGN PATENT DOCUMENTS

| CN | 101903074 A | 12/2010 |
| CN | 102149785 A | 8/2011 |
| CN | 103666404 A | 3/2014 |
| EP | 2 100 650 A1 | 9/2009 |
| JP | 56-48211 A | 5/1981 |
| JP | 7-328318 A | 12/1995 |
| JP | 8-173789 A | 7/1996 |
| JP | 8-309104 A | 11/1996 |
| JP | 10-338868 A | 12/1998 |
| JP | 11-152488 A | 6/1999 |
| JP | 2002-113304 A | 4/2002 |
| JP | 2005-137963 A | 6/2005 |
| JP | 4307091 B2 | 8/2009 |
| JP | 2014-012831 A | 1/2014 |
| JP | 2014-189737 A | 10/2014 |
| JP | 2015-017212 A | 1/2015 |
| JP | 2015-074669 A | 4/2015 |
| JP | 2015-218234 A | 12/2015 |
| JP | 2016-076312 A | 5/2016 |
| JP | 2016-124931 A | 7/2016 |
| JP | 2017-132923 A | 8/2017 |
| JP | 2017-226800 A | 12/2017 |
| WO | 2009/080428 A1 | 7/2009 |
| WO | 2010/006263 A2 | 1/2010 |

(Continued)

OTHER PUBLICATIONS

Official Filing Receipt of U.S. Appl. No. 16/072,588, filed Jul. 25, 2018.

(Continued)

*Primary Examiner* — Jane L Stanley

(74) *Attorney, Agent, or Firm* — Sughrue Mion, PLLC

(57) ABSTRACT

An automotive engine coolant composition includes: a non-silicone surfactant; an anti-foaming agent containing a mineral oil and silica; and a base, in which the base includes at least one alcohol selected from the group consisting of a monohydric alcohol, a dihydric alcohol, a trihydric alcohol, and a glycol monoalkyl ether and/or water, a kinematic viscosity is 8.5 mm$^2$/s or more at 25° C. and 2.0 mm$^2$/s or less at 100° C., and with respect to 100 parts by mass of the coolant composition, a content of the mineral oil is 0.01 to 0.4 parts by mass and a content of the silica is 0.003 to 0.1 parts by mass.

8 Claims, No Drawings

(56) References Cited

FOREIGN PATENT DOCUMENTS

| WO | 2015/041000 A1 | 3/2015 |
| WO | 2016/103027 A1 | 6/2016 |
| WO | 2017/221059 A1 | 12/2017 |

OTHER PUBLICATIONS

Communication dated Jun. 13, 2019, issued by the U.S. Patent and Trademark Office in U.S. Appl. No. 16/072,588.
Final Office Action dated Sep. 30, 2019, issued by the USPTO in U.S. Appl. No. 16/072,588.

* cited by examiner

AUTOMOTIVE ENGINE COOLANT COMPOSITION, AUTOMOTIVE ENGINE CONCENTRATED COOLANT COMPOSITION, AND METHOD OF OPERATING INTERNAL COMBUSTION ENGINE

CROSS-REFERENCE TO RELATED APPLICATIONS

This application is a § 371 of International Application No. PCT/IB2017/000760 filed Jun. 20, 2017 which claims priority from Japanese Patent Application No. 2016-126060 filed Jun. 24, 2016.

BACKGROUND OF THE INVENTION

1. Field of the Invention

The present invention relates to an automotive engine coolant composition, an automotive engine concentrated coolant composition, and a method of operating an internal combustion engine.

2. Description of Related Art

Various types of coolant for cooling automotive engines and the like are known, and among the coolants, water has been widely used as engine coolant because of its highest cooling performance. However, so-called pure water, which does not contain an electrolyte and the like, freezes at 0° C. or lower, and increases in volume, possibly leading to damage to the engine and radiator. Therefore, a coolant composition, which does not use only pure water, and is formed by using a glycol such as ethylene glycol as the base for the purpose of antifreeze properties, diluting this with water so as to obtain a required freezing temperature, and mixing various additives for protecting metals, rubbers, resins, and the like used in the engine or radiator from deterioration as necessary therein has been used.

However, in a case where glycols such as ethylene glycol are used, there is a possibility that the viscosity of the coolant composition may significantly increase particularly at a low temperature. Therefore, in order to adjust the viscosity of the coolant, a surfactant is mixed as a viscosity index improver. As described above, the technique for prompting quick warm-up of the engine and improving fuel efficiency by mixing a surfactant in a coolant and thus appropriately increasing viscosity has been carried out.

For example, Japanese Patent Application Publication No. 2015-74669 (JP 2015-74669 A) discloses a coolant composition which contains three types of alkyl ethers which are different in the number of carbon atoms of an alkyl group and in the average number of moles of ethylene oxide and/or propylene oxide added, and water and/or a water-soluble organic solvent. In addition, Japanese Patent Application Publication No. 2014-189737 (JP 2014-189737 A) discloses a coolant composition which contains two types of alkyl ethers and water and/or a water-soluble organic solvent. Furthermore, Japanese Patent Application Publication No. 2015-17212 (JP 2015-17212 A) discloses a coolant composition which includes: a viscosity index improver (A) which is a polyoxyethylene-polyoxypropylene copolymer having a number average molecular weight of 25,000 to 100,000; a specific compatibilizer (B) which is at least one type selected from the group consisting of a polyoxyethylene-polyoxypropylene copolymer (B1) and a polycarboxylic acid surfactant (B2); and a base (C), and has a specific kinematic viscosity.

However, since the surfactant described above has strong foaming properties, there is concern that the automobile filling properties and cooling performance of a coolant may be significantly affected in practical use. In JP 2015-74669 A, JP 2014-189737 A, and JP 2015-17212 A described above, mixing an arbitrary anti-foaming agent for preventing the foaming properties of the surfactant is described. However, it is not described that foaming of the surfactant is suppressed by actually mixing the anti-foaming agent.

On the other hand, various anti-foaming agents have been developed as a general anti-foaming agent for preventing the foaming properties of a surfactant. For example, Japanese Patent No. 4307091 discloses a heat-transfer medium which is circulated through a heat receiving side system, a heat releasing side system, and an outgaining line and a return line connecting the systems, in which an antifreeze, an anti-foaming agent, and a surfactant for reducing friction resistance against pipes are added to an aqueous liquid, the anti-foaming agent is a silicone compound-based compound, and the concentration of the anti-foaming agent is 8 to 300 ppm. It is also described that the anti-foaming agent is at least one compound selected from a dimethyl silicone oil and a polyoxyalkylene-based silicone oil. Furthermore, regarding the anti-foaming agent, Japanese Patent Application Publication No. 10-338868 (JP 10-338868 A) discloses a composition of a cooling antifreeze which includes ethylene glycol, deionized water, an anti-foaming agent, and an additive such as a typical corrosion inhibitor, in which the additive includes 0.5 to 2.0 wt % of octanoic acid, 0.5 to 2.0 wt % of benzoic acid, 0.1 to 1.0 wt % of sodium phosphate, 0.1 to 1.0 wt % of sodium nitrate, 0.3 to 1.0 wt % of benzotriazole, 0.2 to 1.0 wt % of tritriazole, 0.1 to 1.5 wt % of sodium hydroxide, and 0.1 to 0.8 wt % of sodium molybdate. As the anti-foaming agent, a silicone anti-foaming agent and a polyglycol-based anti-foaming agent are described.

However, in Japanese Patent No. 4307091 and JP 10-338868 A, specific solutions to the problems peculiar to an automotive engine coolant in that the strong foaming properties of a surfactant have a significantly adverse effect on the automobile filling properties and cooling performance of the coolant in practical use are not proposed. Furthermore, there has been a demand for an anti-foaming agent having long life properties for an automotive engine coolant.

SUMMARY OF THE INVENTION

The present invention provides an automotive engine coolant composition which has a specific kinematic viscosity due to an appropriate thickening effect of a surfactant as a viscosity index improver, suppresses foaming properties of the surfactant at a high temperature, and has durability. The present invention also provides an automotive engine concentrated coolant composition for obtaining the automotive engine coolant composition.

As a result of intensive studies to solve the above problems, the inventors have found that by combining a coolant composition containing a non-silicone surfactant and a base with an anti-foaming agent containing a mineral oil and silica, the objects can be achieved, and completed the present invention.

That is, the present invention includes the following inventions.

[1] An automotive engine coolant composition including: a non-silicone surfactant; an anti-foaming agent containing a mineral oil and silica; and a base, in which the base includes at least one alcohol selected from the group consisting of a monohydric alcohol, a dihydric alcohol, a trihydric alcohol, and a glycol monoalkyl ether and/or water, a kinematic viscosity is 8.5 mm$^2$/s or more at 25° C. and 2.0 mm$^2$/s or less at 100° C., and with respect to 100 parts by mass of the coolant composition, a content of the mineral oil is 0.01 to 0.4 parts by mass and a content of the silica is 0.003 to 0.1 parts by mass.

[2] The coolant composition according to [1], further including: a silicone oil or silicone oil compound; and a polyether-modified silicone.

[3] The coolant composition according to [2], in which, with respect to 100 parts by mass of the coolant composition, a total content of the silicone oil or silicone oil compound and the polyether-modified silicone is 0.05 parts by mass or more.

[4] The coolant composition according to [2] or [3], in which a content of the silicone oil or silicone oil compound is 0.001 to 1 parts by mass with respect to 100 parts by mass of the coolant composition, and a content of the polyether-modified silicone is 0.001 to 10 parts by mass with respect to 100 parts by mass of the coolant composition.

[5] The coolant composition according to any one of [2] to [4], in which a mass ratio between the silicone oil or silicone oil compound and the polyether-modified silicone is from 9:1 to 1:9.

[6] The coolant composition according to any one of [1] to [5], in which the base contains an organic solvent.

[7] An automotive engine concentrated coolant composition for obtaining the coolant composition according to any one of [1] to [6], which is diluted 2 to 10 times by mass with a base so as to be used.

[8] The concentrated coolant composition according to [7], in which, with respect to 100 parts by mass of the concentrated coolant composition, a non-silicone surfactant: 0.02 to 99.98 parts by mass; an anti-foaming agent containing a mineral oil and silica: 0.02 to 20 parts by mass; a solvent: 0 to 99.8 parts by mass; a silicone oil or silicone oil compound: 0.002 to 10 parts by mass; and a polyether-modified silicone: 0.002 to 90 parts by mass are contained.

[9] A method of operating an internal combustion engine, which uses the coolant composition according to any one of [1] to [6] as a coolant.

The automotive engine coolant composition of the present invention has a specific kinematic viscosity due to an appropriate thickening effect of the surfactant as a viscosity index improver, can suppress the foaming properties of the surfactant at a high temperature, and thus can improve the fuel efficiency effect of an internal combustion engine. In addition, the automotive engine coolant composition of the present invention has durability. Furthermore, the automotive engine coolant composition can be obtained by diluting the automotive engine concentrated coolant composition of the present invention.

DETAILED DESCRIPTION OF EMBODIMENTS

An automotive engine coolant composition of the present invention (hereinafter, also referred to as a coolant composition of the present invention) includes a non-silicone surfactant (A), an anti-foaming agent containing specific amounts of a mineral oil (B) and silica (C), and a base (D). The inventors found that by combining a coolant composition containing a non-silicone surfactant and a base with an anti-foaming agent containing specific amounts of a mineral oil and silica, (1) a significant decrease in the thickening effect of a surfactant (viscosity index improver) can be prevented, (2) an anti-foaming effect can be obtained at a high temperature, and (3) anti-foaming properties can be maintained for a long period of time under a high temperature environment.

There is a possibility that an anti-foaming agent of the related art, depending on the type, (1) may significantly decrease the thickening effect of a surfactant as a viscosity index improver and (2) cannot achieve an anti-foaming effect at a high temperature, and (3) the anti-foaming agent may not have thermal durability and the effect thereof is reduced or lost within a short period of time. In the present invention, regarding the kinematic viscosity, a low temperature means about 25° C. and a high temperature means about 100° C. In addition, regarding the anti-foaming effect, the low temperature means about 25° C., and the high temperature means about 90° C.

Although the details of mechanisms for causing the specific kinematic viscosity to be exhibited due to an appropriate thickening effect of the viscosity index improver according to the present invention are not clear, the following is conceivable. That is, it is conceivable that as the viscosity index improver is present in a coolant, a complex with the base is formed, a certain type of structure is formed in the coolant, and the structure can be changed by a change in temperature, so that the viscosity characteristics of the coolant can be adjusted. However, there may be cases where when the non-silicone surfactant (A) is used as the viscosity index improver, the surface active performance causes foaming of the coolant. As a method of suppressing foaming, a method of adding an anti-foaming agent is generally adopted. However, it is conceivable that when an anti-foaming agent having a structure close to the structure of the non-silicone surfactant (A), such as polypropylene glycol, polyoxyethylene alkyl ether, higher alcohols, or phosphate ester is used, the structure of a structure formed in the coolant is changed due to the strength of the affinity thereof, which affects the kinematic viscosity of the coolant, or causes the anti-foaming agent that has to be present at the interface with the air to be incorporated into the coolant, leading to the loss of the anti-foaming performance. On the other hand, it is conceivable that since the mineral oil (B) does not have a strong affinity with the non-silicone surfactant (A), the mineral oil (B) is not incorporated into the structure formed in the coolant, does not affect the kinematic viscosity of the coolant, and can be present at the interface between the air and the coolant, that is, on the surface of films of a foam during foaming. Furthermore, it is conceivable that since the silica (C) (preferably hydrophobic silica) which acts on the films of the foam and functions as a defoamer is well dispersed in the mineral oil (B), the silica (C) is present on the films of the foam together with the mineral oil (B), does not affect the kinematic viscosity of the coolant, and exhibits an anti-foaming effect. Moreover, it is conceivable that since the mineral oil (B) has high thermal durability, the anti-foaming effect can be obtained at a high temperature, and the effect is not reduced nor lost within a short period of time. However, it should not be construed as being limited to the mechanisms.

Although not restrained by theory, the anti-foaming agent containing the mineral oil (B) and the silica (C) does not inhibit the thickening effect of a surfactant as a viscosity index improver due to a low affinity with an alkyl group, can exhibit an anti-foaming effect in a water system due to low water solubility. Therefore, the problems (1) and (2) can be solved. In addition, the anti-foaming agent can solve the problem (3) due to excellent durability.

The non-silicone surfactant (A) used in the coolant composition of the present invention can be typically used as a viscosity index improver in the coolant composition and is not particularly limited as long as the effects of the present invention can be obtained. The non-silicone surfactant (A) may be any of a nonionic surfactant, an anionic surfactant, a cationic surfactant, and an amphoteric surfactant. One type of the non-silicone surfactant (A) may be used singly, or two or more types thereof may be used in combination.

Specific examples of the nonionic surfactant include a compound having a polyalkylene glycol chain, an ester of a fatty acid with a polyhydric alcohol such as glycerin, sorbitol, or sucrose, a fatty acid alkanolamide, and the like. From the viewpoint of heat resistance and water solubility, a compound having a polyalkylene glycol chain is preferable, and a compound having a polyethylene glycol chain is more preferable. Examples of the compound having a polyethylene glycol chain include polyoxyethylene polyoxypropylene glycol, polyoxyethylene monoalkyl ether, polyoxyethylene dialkyl ether, polyoxyethylene polyoxypropylene alkyl ether, polyoxyethylene alkyl phenyl ether, polyethylene glycol polyhydric alcohol ether, polyethylene glycol alkyl amino ether, polyethylene glycol mono fatty acid ester, polyethylene glycol difatty acid ester, polyoxyethylene sorbitan fatty acid ester, polyoxyethylene sorbitol fatty acid ester, polyoxyethylene glycerin fatty acid ester, polyoxyethylene castor oil, polyoxyethylene hydrogenated castor oil, and polyoxyethylene fatty acid amide. Among these, polyoxyethylene monoalkyl ether, fatty acid alkanol amide, polyethylene glycol difatty acid ester, and polyoxyethylene fatty acid amide, which greatly increase in kinematic viscosity at 25° C. in a low mixing amount, are preferable, and polyoxyethylene monoalkyl ether is more preferable.

The polyoxyalkylene alkyl ether is preferably a compound represented by the following formula (1):

[in the formula, $R^a$ is a linear or branched alkyl or alkenyl group having 12 or more and 24 or less carbon atoms, $R^b$ is an ethylene group or a propylene group, p represents an average number of moles of $R^b O$ added, and is a number from 0.5 or more and 20 or less.

Regarding $R^a$ mentioned above, the alkyl group or alkenyl group may be linear or branched, and is preferably linear from the viewpoint of thickening effect. The number of carbon atoms of the alkyl group or alkenyl group is preferably 12 or more and 24 or less, more preferably 16 or more and 22 or less, and even more preferably 20 or more and 22 or less.

Specific examples thereof include: an alkyl group such as a lauryl group, a myristyl group, a cetyl group, a margaryl group, an isostearyl group, a 2-heptylundecyl group, a stearyl group, an arachidyl group, a behenyl group, and a lignoceryl group; and an alkenyl group such as an oleyl group. A cetyl group, a stearyl group, and a behenyl group are preferable, and a stearyl group and a behenyl group are more preferable.

$R^b$ mentioned above is preferably an ethylene group or a propylene group, and is more preferably an ethylene group from the viewpoint of thickening effect.

p mentioned above represents the average number of moles of $R^b O$ added, and from the viewpoint of thickening effect, is preferably a number from 0.5 or more and 20 or less, more preferably a number from 1 or more and 15 or less, even more preferably a number from 2 or more and 11 or less, and even more preferably a number from 3 or more and 8 or less.

Examples of the anionic surfactant include an alkyl sulfuric acid ester salt, a polyoxyethylene alkyl ether sulfuric acid ester salt, an alkylbenzene sulfonic acid salt, a fatty acid salt, an alkyl phosphoric acid ester salt, and a polyoxyethylene alkyl ether phosphoric acid ester salt. A polyoxyethylene alkyl ether sulfuric acid ester salt, which greatly increases in kinematic viscosity at 25° C. in a low mixing amount, is preferable.

The polyoxyethylene alkyl ether sulfuric acid ester salt is preferably a compound represented by the following formula (2):

[in the formula, $R^c$ is a linear or branched alkyl or alkenyl group having 16 or more and 24 or less carbon atoms, $R^d$ is an ethylene group or a propylene group, q represents an average number of moles of $R^d O$ added, and is a number from 0.5 or more and 10 or less, and M is a cation or a hydrogen atom.]

Regarding $R^c$ mentioned above, the alkyl group may be linear or branched, and is preferably linear from the viewpoint of thickening effect. The number of carbon atoms of the alkyl group and the alkenyl group is preferably 16 or more and 24 or less, more preferably 18 or more and 22 or less, and even more preferably 20 or more and 22 or less.

Specific examples thereof include: an alkyl group such as a cetyl group, a margaryl group, an isostearyl group, a 2-heptylundecyl group, a stearyl group, an arachidyl group, a behenyl group, a lignoceryl group; and an alkenyl group such as an oleyl group. A cetyl group, a stearyl group, an arachidyl group, and a behenyl group are preferable, and a behenyl group is more preferable.

$R^d$ mentioned above is preferably an ethylene group or a propylene group, and is more preferably an ethylene group from the viewpoint of thickening effect.

q mentioned above represents the average number of moles of $R^d O$ added, and from the viewpoint of having a specific kinematic viscosity at a low temperature and a high temperature, is preferably a number from 0.5 or more and 10 or less, and more preferably a number from 1 or more and 8 or less, even more preferably a number from 2 or more and 7 or less, and even more preferably a number from 3 or more and 6 or less.

M mentioned above is a cation or a hydrogen atom, and is preferably a cation. Specific examples of the cation include an alkali metal ion and an ammonium ion, and examples of the alkali metal include lithium, sodium, and potassium. Sodium or potassium is preferable.

Examples of the cationic surfactant include an alkylamine salt and a quaternary ammonium salt.

Examples of the amphoteric surfactant include an alkylbetaine and an alkylamine oxide.

The non-silicone surfactant (A) used in the coolant composition of the present invention can be typically used as a viscosity index improver in the coolant composition and is not particularly limited as long as the effects of the present invention can be obtained. From the viewpoint of thickening effect, a nonionic surfactant or an anionic surfactant is preferable, and an anionic surfactant is more preferable.

The coolant composition of the present invention may contain an alkali metal compound (A'). In a case where the non-silicone surfactant (A) used is an anionic surfactant, particularly an anionic surfactant represented by the formula (2), the alkali metal compound (A') is preferably contained.

The alkali metal compound (A') is at least one type selected from the group consisting of an alkali metal salt and an alkali metal hydroxide, and the alkali metal salt excludes the non-silicone surfactant (A). Examples of the alkali metal include sodium, potassium, and lithium. Examples of the alkali metal salt include an alkali metal salt of an inorganic acid or an organic acid, and an alkali metal salt of a triazole or a thiazole. Examples of the alkali metal salt of an inorganic acid include an alkali metal salt of nitrous acid such as sodium nitrite and potassium nitrite; an alkali metal salt of nitric acid such as sodium nitrate and potassium nitrate; an alkali metal salt of molybdic acid such as sodium molybdate and potassium molybdate; an alkali metal salt of hypochlorous acid such as sodium hypochlorite and potassium hypochlorite; an alkali metal salt of sulfuric acid such as sodium sulfate and potassium sulfate; an alkali metal salts of carbonic acid such as sodium carbonate and potassium carbonate; an alkali metal salt of hydrochloric acid such as sodium chloride and potassium chloride; an alkali metal salt of phosphoric acid such as sodium phosphate and potassium phosphate; an alkali metal salt of silicic acid such as sodium silicate and potassium silicate; and an alkali metal salt of boric acid such as sodium borate and potassium borate. Examples of the alkali metal salt of an organic acid include an alkali metal salt of an aromatic carboxylic acid such as benzoic acid, p-toluic acid, and p-tertbutylbenzoic acid; and an alkali metal salt of an aliphatic polyvalent carboxylic acid such as azelaic acid, sebacic acid, undecanedioic acid, dodecanedioic acid, and citric acid. Examples of the alkali metal salt of a triazole or a thiazole include an alkali metal salt of benzotriazole. Among the above-mentioned alkali metal salts, an alkali metal salt of an aliphatic polyvalent carboxylic acid is preferable from the viewpoint of causing the kinematic viscosity of the coolant composition at a low temperature and a high temperature to be in the predetermined range described above, and dipotassium sebacate is more preferable. In a case where an alkali metal salt is used as a rust inhibitor and/or a pH adjusting agent or the like, it is presumed that this is used as the alkali metal salt. In that case, an alkali metal compound does not necessarily need to be separately added.

The alkali metal hydroxide is not particularly limited, and specific examples thereof include lithium hydroxide, sodium hydroxide, and potassium hydroxide. Among the above-mentioned alkali metal hydroxides, potassium hydroxide is preferable from the viewpoint of causing the kinematic viscosity of the coolant composition at a low temperature and a high temperature to be in the predetermined range described above.

The content of the non-silicone surfactant (A) in the coolant composition of the present invention is, with respect to the base described later (with respect to 100 g), preferably 0.01 mmol or more, more preferably 0.05 mmol or more, even more preferably 0.1 mmol or more, even more preferably 0.15 mmol or more, even more preferably 0.2 mmol or more, even more preferably 0.25 mmol or more, even more preferably 0.3 mmol or more, and even more preferably 0.4 mmol or more from the viewpoint of causing the kinematic viscosity of the coolant composition at a low temperature and a high temperature to be in the predetermined range described above, is preferably 3 mmol or less, more preferably 2 mmol or less, and even more preferably 1 mmol or less from the viewpoint of enhancing cooling properties and suppressing semisolidification, and is preferably 0.01 mmol or more and 3 mmol or less, more preferably 0.15 mmol or more and 3 mmol or less, even more preferably 0.2 mmol or more and 2 mmol or less, even more preferably 0.3 mmol or more and 1 mmol or less, and even more preferably 0.4 mmol or more and 1 mmol or less from these viewpoints. In the case of using the rust inhibitor and/or the pH adjusting agent, the content of the non-silicone surfactant (A) is preferably in the range described above with respect to the total amount of the base and the rust inhibitor and/or the pH adjusting agent (with respect to 100 g).

In addition, the content of the non-silicone surfactant (A) in 100 parts by mass of the coolant composition of the present invention is preferably 0.005 parts by mass or more, more preferably 0.01 parts by mass or more, even more preferably 0.05 parts by mass or more, even more preferably 0.08 parts by mass or more, even more preferably 0.1 parts by mass or more, and even more preferably 0.2 parts by mass or more from the viewpoint of causing the kinematic viscosity of the coolant composition at a low temperature and a high temperature to be in the predetermined range described above, is preferably 3 parts by mass or less, more preferably 1.8 parts by mass or less, even more preferably 1 part by mass or less, and even more preferably 0.6 parts by mass or less from the viewpoint of enhancing cooling properties and suppressing semisolidification, and is preferably 0.005 to 3 parts by mass, more preferably 0.01 to 1.8 parts by mass, even more preferably 0.08 to 1 parts by mass, even more preferably 0.1 to 0.6 parts by mass, and even more preferably 0.2 to 0.6 parts by mass from these viewpoints.

The content of the alkali metal compound (A') in the coolant composition of the present invention in combination with the non-silicone surfactant (A) used is, with respect to the base described later (with respect to 100 g), preferably 0.5 mmol or more, more preferably 1.0 mmol or more, even more preferably 1.5 mmol or more, even more preferably 3 mmol or more, and even more preferably 5 mmol or more from the viewpoint of causing the kinematic viscosity of the coolant composition at a low temperature and a high temperature to be in the predetermined range described above, is preferably 90 mmol or less, more preferably 70 mmol or less, even more preferably 45 mmol or less, even more preferably 20 mmol or less, and even more preferably 15 mmol or less from the viewpoint of enhancing cooling properties and suppressing precipitation, and is preferably 0.5 mmol or more and 90 mmol or less, more preferably 1 mmol or more and 90 mmol or less, even more preferably 1 mmol or more and 70 mmol or less, even more preferably 1 mmol or more and 45 mmol or less, even more preferably 1.5 mmol or more and 20 mmol or less, even more preferably 3 mmol or more and 20 mmol or less, and even more preferably 5 mmol or more and 15 mmol or less from these viewpoints. In the case of using the rust inhibitor and/or the pH adjusting agent, the content of the alkali metal compound is preferably in the range described above with respect to the total amount of the base and the rust inhibitor and/or the pH adjusting agent (with respect to 100 g).

In a case of being used together with $C_{22}H_{45}O$—$(CH_2CH_2O)_4$—$SO_3Na$ or $C_{22}H_{45}O$—$(CH_2CH_2O)_4$—$SO_3K$ as the non-silicone surfactant (A), the content of the alkali metal compound (A') is, with respect to the base described later (with respect to 100 g), preferably 1.0 mmol or more and 90 mmol or less, and more preferably 1.0 mmol or more and 45 mmol or less. In a case where both an alkali metal salt and an alkali metal hydroxide are used, the content of the alkali metal compound is the total number of moles thereof. In the case of using an alkali metal compound as the rust inhibitor and/or the pH adjusting agent, the content of the alkali metal compound is calculated by including the rust inhibitor and/or the pH adjusting agent as the alkali metal compound.

The content of the alkali metal compound (A') in the coolant composition of the present invention in 100 parts by mass of the coolant composition of the present invention in combination with the non-silicone surfactant (A) used is preferably 0.01 parts by mass or more, more preferably 0.02 parts by mass or more, even more preferably 0.03 parts by mass or more, even more preferably 0.05 parts by mass or more, even more preferably 0.1 parts by mass or more, even more preferably 0.25 parts by mass or more, even more preferably 0.5 parts by mass or more, and even more preferably 1 part by mass or more from the viewpoint of causing the kinematic viscosity of the coolant composition at a low temperature and a high temperature to be in the predetermined range described above, and is preferably 30 parts by mass or less, more preferably 21 parts by mass or less, even more preferably 20 parts by mass or less, even more preferably 10 parts by mass or less, even more preferably 7 parts by mass or less, and even more preferably 5 parts by mass or less from the viewpoint of enhancing cooling properties and suppressing precipitation. From these viewpoints, the content of the alkali metal compound is preferably 0.01 to 30 parts by mass, more preferably 0.01 to 20 parts by mass, even more preferably 0.02 to 10 parts by mass, even more preferably 0.03 to 10 parts by mass, even more preferably 0.05 to 7 parts by mass, even more preferably 0.1 to 7 parts by mass, even more preferably 0.5 to 7 parts by mass, even more preferably 1 to 7 parts by mass, and even more preferably 1 to 5 parts by mass. In the case of using an alkali metal compound as the rust inhibitor and/or the pH adjusting agent, the content of the alkali metal compound is calculated by including the rust inhibitor and/or the pH adjusting agent as the alkali metal compound.

In the coolant composition of the present invention, the molar ratio (alkali metal ions/non-silicone surfactant) of the alkali metal ions to the non-silicone surfactant (A) is preferably 1.5 or more, preferably 2.5 or more, even more preferably 3 or more, even more preferably 5 or more, even more preferably 10 or more, even more preferably 20 or more, even more preferably 30 or more, and even more preferably 40 or more from the viewpoint of causing the kinematic viscosity of the coolant composition at a low temperature and a high temperature to be in the predetermined range described above, is preferably 3000 or less, more preferably 2500 or less, even more preferably 2000 or less, even more preferably 1500 or less, even more preferably 1100 or less, even more preferably 1000 or less, even more preferably 700 or less, even more preferably 500 or less, even more preferably 300 or less, even more preferably 200 or less, and even more preferably 100 or less from the same viewpoint, and is preferably 1.5 or more and 3000 or less, more preferably 2.5 or more and 3000 or less, even more preferably 3 or more and 2500 or less, even more preferably 5 or more and 2000 or less, even more preferably 5 or more and 1500 or less, even more preferably 10 or more and 1000 or less, even more preferably 10 or more and 700 or less, even more preferably 20 or more and 500 or less, even more preferably 30 or more and 300 or less, even more preferably 30 or more and 200 or less, even more preferably 30 or more and 100 or less, and even more preferably 40 or more and 100 or less from these viewpoints.

The number of moles of the alkali metal ions is, in a case where there are a plurality of types of alkali metals, the total number of moles of the alkali metals. Alkali metal ions mean ions of all alkali metals in the coolant, contain not only alkali metal ions derived from the alkali metal compound but also alkali metal ions derived from the non-silicone surfactant and alkali metal ions derived from other arbitrary components such as the rust inhibitor and the pH adjusting agent. In addition, in a case where the non-silicone surfactant is a mixture, the number of moles of the non-silicone surfactant is the total number of moles of the components of the mixture.

In an embodiment of the coolant composition of the present invention, the mineral oil (B) is not particularly limited as long as the effects of the present invention can be obtained. Examples thereof include oils such as paraffinic and naphthenic oils, and those refined from the oils by appropriately combining vacuum distillation, deasphalting, solvent extraction, hydrocracking, solvent dewaxing, sulfuric acid cleaning, white clay refining, hydrorefining, and the like. Mineral oils also include natural mineral oils, that is, those refined as described above from natural crude oils. One type of these may be used singly, or two or more types thereof may be used in combination.

In the embodiment of the coolant composition of the present invention, the mineral oil (B) is not particularly limited as long as the effects of the present invention can be obtained, and those well-known may be used.

In the embodiment of the coolant composition of the present invention, the silica (C) is not particularly limited as long as the effects of the present invention can be obtained. Examples thereof include fine silica powder such as fumed silica, precipitated silica, and pyrogenic silica. One type of these may be used singly, or two or more types thereof may be used in combination. The silica may be surface untreated silica or silica in which the surface is hydrophobized. The hydrophobization of the silica surface can be performed by a method of the related art, that is, a treatment of a hydrophilic silica with an organosilicon compound such as an organochlorosilane, an organoalkoxysilane, an organodisilazane, an organopolysiloxane, or an organohydrogenpolysiloxane. In terms of anti-foaming properties and workability, the specific surface area (BET method) of the silica is preferably 50 $m^2/g$ or more, more preferably 50 to 700 $m^2/g$, and even more preferably 80 to 500 $m^2/g$.

In the embodiment of the coolant composition of the present invention, the silica (C) is not particularly limited as long as the effects of the present invention can be obtained, and those well-known may be used. Examples thereof include AEROSIL R972, R972V, R972CF, and R974 manufactured by EVONIK. Among these, hydrophobic silica is preferable. One type of these may be used singly, or two or more types thereof may be used in combination.

In the embodiment of the coolant composition of the present invention, the anti-foaming agent containing the mineral oil (B) and the silica (C) is not particularly limited as long as the effects of the present invention can be obtained, and those well-known may be used. Examples thereof include SN-DEFOAMER VL manufactured by SAN NOPCO LIMITED, and SN-DEFOAMER 777, SN-DEFOAMER 476-L, and SN-DEFOAMER 154 manufactured by SAN NOPCO LIMITED. Among these, an anti-foaming agent in which a polyether is mixed is preferable. One type of these may be used singly, or two or more types thereof may be used in combination.

The content of the mineral oil (B) in the coolant composition of the present invention is, with respect to 100 parts by mass of the coolant composition, 0.01 parts by mass or more, preferably 0.02 parts by mass or more, more preferably 0.04 parts by mass or more, even more preferably 0.06 parts by mass or more, and even more preferably 0.08 parts by mass or more from the viewpoint of the durability of the anti-foaming effect at a high temperature, is 0.4 parts by mass or less, preferably 0.3 parts by mass or less, more preferably 0.2 parts by mass or less, and even more preferably 0.1 parts by mass or less from the viewpoint of causing the kinematic viscosity of the coolant composition at a low temperature and a high temperature to be in the predetermined range described above, and is 0.01 to 0.4 parts by mass, preferably 0.02 to 0.4 parts by mass, more preferably 0.04 to 0.3 parts by mass, even more preferably 0.06 to 0.2 parts by mass, and even more preferably 0.08 to 0.1 parts by mass from these viewpoints.

The content of the silica (C) in the coolant composition of the present invention is, with respect to 100 parts by mass of the coolant composition, 0.003 parts by mass or more, preferably 0.004 parts by mass or more, more preferably 0.005 parts by mass or more, even more preferably 0.006 parts by mass or more, and even more preferably 0.008 parts by mass or more from the viewpoint of anti-foaming properties at a high temperature, is 0.1 parts by mass or less, preferably 0.08 parts by mass or less, more preferably 0.07 parts by mass or less, even more preferably 0.06 parts by mass or less, and even more preferably 0.05 parts by mass or less from the viewpoint of causing the kinematic viscosity of the coolant composition at a low temperature and a high temperature to be in the predetermined range described above and preventing agglomeration of the silica, and is 0.003 to 0.1 parts by mass, preferably 0.004 to 0.08 parts by mass, more preferably 0.005 to 0.07 parts by mass, even more preferably 0.006 to 0.06 parts by mass, and even more preferably 0.008 to 0.05 parts by mass from these viewpoints. In a case where silica is used as a filler (E2) of a silicone oil compound (E), which will be described later, the amount of the silica mixed therein is also included in the content.

In the coolant composition of the present invention, the mass ratio (mineral oil/silica) of the mineral oil (B) to the silica (C) is preferably 0.5 or more, more preferably 1 or more, even more preferably 2 or more, and even more preferably 3 or more from the viewpoint of the dispersibility of the anti-foaming agent, is preferably 30 or less, more preferably 25 or less, even more preferably 23 or less, and even more preferably 20 or less from the viewpoint of causing the kinematic viscosity of the coolant composition at a low temperature and a high temperature to be in the predetermined range described above and ensuring the anti-foaming effect at a high temperature and durability, and is preferably 0.5 to 30, more preferably 1 to 25, even more preferably 2 to 23, and even more preferably 3 to 20 from these viewpoints. In a case where silica is used as the filler (E2) of the silicone oil compound (E), the amount of the silica mixed therein is also included in the content.

Examples of the base (D) used in the coolant composition of the present invention include water and an organic solvent, which can be used singly as water or an organic solvent, or as a mixture of water and an organic solvent. It is preferable to use a mixture of water and an organic solvent in consideration of antifreeze properties. In the coolant composition of the present invention, the base (D) is preferably contained as a primary component. Here, the "primary component" is a component that serves as the base of the coolant composition and indicates the most abundant component. If necessary, an additive or the like may be mixed in the base (D) for use in a range in which the effects of the present invention are not impaired. In this specification, the corresponding components contained in the coolant composition of the present invention are defined as other additives, which will be described later.

The organic solvent can be typically used in the coolant composition and is not particularly limited as long as the effects of the present invention can be obtained. An aqueous organic solvent is preferable, and examples thereof include at least one alcohol selected from the group consisting of a monohydric alcohol, a dihydric alcohol, a trihydric alcohol, and a glycol monoalkyl ether.

Examples of the monohydric alcohol include one or a mixture of two or more selected from methanol, ethanol, propanol, butanol, pentanol, hexanol, heptanol, and octanol.

Examples of the dihydric alcohol include one or a mixture of two or more selected from ethylene glycol, diethylene glycol, triethylene glycol, propylene glycol, 1,3-propanediol, 1,4-butanediol, 1,3-butanediol, 1,5-pentanediol, and hexylene glycol.

Examples of the trihydric alcohol include one or a mixture of two or more selected from glycerin, trimethylolethane, trimethylolpropane, 5-methyl-1,2,4-heptanetriol, and 1,2,6-hexanetriol.

Examples of the glycol monoalkyl ether include one or a mixture of two or more selected from ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether, and tetraethylene glycol monobutyl ether.

Among the above-mentioned organic solvents, ethylene glycol, propylene glycol, and 1,3-propanediol are preferable from the viewpoint of handleability, costs, and ease of acquisition.

Therefore, the base (D) preferably contains one or more selected from the group consisting of ethylene glycol, propylene glycol, 1,3-propanediol, and water, and more preferably contains ethylene glycol and water. In addition, the base is preferably composed of one or more selected from the group consisting of ethylene glycol, propylene glycol, 1,3-propanediol, and water, and is more preferably composed of ethylene glycol and water. Deionized water is preferable as the water used in the base.

In 100 parts by mass of the coolant composition of the present invention, the content of the base (D) is preferably 50 parts by mass or more, more preferably 75 parts by mass or more, even more preferably 80 parts by mass or more, and even more preferably 90 parts by mass or more from the viewpoint of functioning as a coolant, is preferably 99.92 parts by mass or less, more preferably 99.9 parts by mass or less, even more preferably 99.8 parts by mass or less, and even more preferably 99.7 parts by mass or less from the viewpoint of mixing the components of the coolant composition of the present invention, and is preferably 50 to 99.92 parts by mass, more preferably 80 to 99.9 parts by mass, even more preferably 90 to 99.9 parts by mass, even more preferably 90 to 99.8 parts by mass, and even more preferably 90 to 99.7 parts by mass from these viewpoints.

In a case where the base (D) contains water and alcohols, the mixing ratio between water and alcohols can be arbitrarily adjusted in consideration of antifreeze properties and inflammability. The mass ratio between water and alcohols in the base is preferably 20:80 to 90:10 (water:alcohols), and more preferably 40:60 to 75:25 from the viewpoint of avoiding generation of a flash point.

The coolant composition of the present invention may further contain (E) a silicone oil or silicone oil compound and (F) a polyether-modified silicone. Accordingly, it becomes possible to further improve the anti-foaming effect at a high temperature and durability.

In the embodiment of the coolant composition of the present invention, the silicone oil (E) is preferably an organopolysiloxane (E1), which will be described later, regarding the silicone oil compound (E). One type of the silicone oil (E) may be used singly, or two or more types thereof may be used in combination.

In the embodiment of the coolant composition of the present invention, the silicone oil compound (E) preferably contains the organopolysiloxane (E1) and the filler (E2). One type of the silicone oil compound (E) may be used singly, or two or more types thereof may be used in combination.

The organopolysiloxane (E1) is preferably represented by the following general formula (3):

$$R_m SiO_{(4-m)/2} \quad (3)$$

[in the formula, R's are each independently a substituted or unsubstituted monovalent hydrocarbon group; and m is a number from 1.9 to 2.2.]. The organopolysiloxane (E1) is inherently hydrophobic. The organopolysiloxane (E1) may be either linear or branched. One type of the organopolysiloxane (E1) may be used singly, or two or more types thereof may be used in combination.

R in the general formula (3) is preferably, each independently a substituted or unsubstituted monovalent hydrocarbon group having 1 to 18 carbon atoms. Examples of the unsubstituted monovalent hydrocarbon group include an alkyl group such as a methyl group, an ethyl group, a propyl group, a butyl group, a pentyl group, a hexyl group, a heptyl group, an octyl group, a nonyl group, a decyl group, a dodecyl group, a tridecyl group, a tetradecyl group, a hexadecyl group, and an octadecyl group, a cycloalkyl group such as a cyclohexyl group, an alkenyl group such as a vinyl group and an allyl group, an aryl group such as a phenyl group and a tolyl group, and an arylalkenyl group such as a styryl group and an α-methylstyryl group. Examples of the substituted monovalent hydrocarbon group include those in which a part or all of hydrogen atoms bonded to the carbon atoms of the above groups are substituted with a halogen atom, a cyano group, an amino group, a hydroxyl group, or the like, for example, a chloromethyl group, a 3-chloropropyl group, a 3,3,3-trifluoropropyl group, a cyanoethyl group, a 3-aminopropyl group, and an N-(β-aminoethyl)-γ-aminopropyl group.

In terms of anti-foaming properties and economic efficiency, it is preferable that 80% or more, particularly 90% or more of the total number of groups represented by R in the general formula (3) is a methyl group.

It is preferable that in the general formula (3), m is a number that satisfies 1.9≤m≤2.2 and satisfies 1.95≤m≤2.15 from the viewpoint of anti-foaming properties and workability.

An end of the organopolysiloxane represented by the general formula (3) may be blocked by a triorganosilyl group represented by R$_3$Si— (R is the same as defined in the formula (3)), or may be blocked by a diorganohydroxysilyl group represented by HOR$_2$Si— (R is the same as defined in the formula (3)).

In terms of anti-foaming properties and workability, the viscosity at 25° C. of the organopolysiloxane (E1) measured by an Ostwald viscometer is preferably 10 to 100,000 mm²/s, and more preferably 50 to 30,000 mm²/s. When below the lower limit, the anti-foaming performance of the silicone oil compound (E) is slightly low, and when above the upper limit, the viscosity of the silicone oil compound (E) increases, which results poor workability even though there is no problem in performance.

The filler (E2) is mixed for the purpose of enhancing the anti-foaming effect of the organopolysiloxane (E1), employs, specifically, fine silica powder, titania, ground quartz, alumina, aluminosilicate, an organic wax (for example, polyethylene wax and microcrystalline wax), zinc oxide, magnesium oxide, and an alkylamide (for example, ethylenebisstearylamide and methylenebisstearylamide). From the viewpoint of an affinity with organopolysiloxane and ease of acquisition, fine silica powder is preferable. One type of the filler (E2) may be used singly, or two or more types thereof may be used in combination.

As the fine silica powder, those well-known may be used, and examples thereof include fumed silica, precipitated silica, pyrogenic silica and the like. One of these may be used singly, or two or more of them may be used in combination. In terms of anti-foaming properties and workability, the specific surface area (BET method) of the fine silica powder is preferably 50 m²/g or more, more preferably 50 to 700 m²/g, and even more preferably 80 to 500 m²/g. When the specific surface area thereof is less than 50 m²/g, the anti-foaming performance is slightly low, and when above 700 m²/g, the viscosity of the silicone oil compound (E) increases, which results poor workability even though there is no problem in performance.

Furthermore, the fine silica powder may be surface untreated silica or silica in which the surface is hydrophobized. The hydrophobization of the silica surface can be performed by a method of the related art, that is, a treatment of a hydrophilic silica with an organosilicon compound such as an organochlorosilane, an organoalkoxysilane, an organodisilazane, an organopolysiloxane, or an organohydrogenpolysiloxane.

In terms of anti-foaming properties and workability, the amount of the organopolysiloxane (E1) added is preferably 70 to 99 parts by mass, and more preferably 80 to 97 parts by mass, with respect to 100 parts by mass of the silicone oil compound (E).

In terms of anti-foaming properties and workability, the amount of the filler (E2) added is preferably 1 to 20 parts by mass, and more preferably 3 to 15 parts by mass, with respect to 100 parts by mass of the silicone oil compound (E). When the added amount is less than 1 part by mass, the anti-foaming performance is slightly low, and when above 20 parts by mass, the viscosity of the silicone oil compound (E) increases, which results poor workability even though there is no problem in performance.

The silicone oil compound (E) used in the coolant composition of the present invention can be prepared according to a well-known method, for example, can be prepared by a method of mixing the organopolysiloxane (E1) and the filler (E2) together, heating the mixture at a temperature of 80° C. to 200° C., and performing neutralization and/or removal of low-boiling-point fractions on the resultant if necessary.

In order to improve the anti-foaming durability of the anti-foaming agent, high temperature characteristics, dilution stability, alkali resistance, and the like, an inorganic ammonium salt, an organosilicon compound, a siloxane resin other than the components (E1), (E2), and (F), an alkaline catalyst, and the like may be added to the silicone oil or silicone oil compound (E). In this specification, the components contained in the coolant composition of the present invention are defined as other additives, which will be described later.

In the embodiment of the coolant composition of the present invention, the polyether-modified silicone (F) is preferably a polyoxyalkylene-modified organopolysiloxane expressed by the following general formula (4):

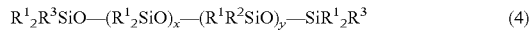

$$R^1{}_2R^3SiO-(R^1{}_2SiO)_x-(R^1R^2SiO)_y-SiR^1{}_2R^3 \quad (4)$$

[in the formula, $R^1$'s are substituted or unsubstituted monovalent hydrocarbon groups having 1 to 18 carbon atoms, which are the same or different from each other; $R^2$ is a monovalent organic group expressed by the following general formula (5):

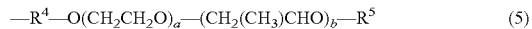

$$-R^4-O(CH_2CH_2O)_a-(CH_2(CH_3)CHO)_b-R^5 \quad (5)$$

(in the formula, $R^4$ is a divalent hydrocarbon group having 2 to 6 carbon atoms; $R^5$ is a hydrogen atom or a monovalent organic group selected from the group consisting of an alkyl group having 1 to 6 carbon atoms, an acetyl group, and an isocyanate group; a is a positive number, b is 0 or a positive number, and a and b satisfy $2 \leq a+b \leq 80$ and $b/a=0$ to 4); $R^3$ is the group employed as $R^1$ or $R^2$, a hydroxyl group, or an alkoxy group having 1 to 6 carbon atoms; x is an integer from 3 to 200; and y is an integer from 1 to 60], whereby the silicone oil or silicone oil compound (E) can be dispersed in the base (D) described above.

In the above general formula (4), $R^1$'s are substituted or unsubstituted monovalent hydrocarbon groups having 1 to 18 carbon atoms, which are the same or different from each other, examples of the unsubstituted monovalent hydrocarbon group include an alkyl group such as a methyl group, an ethyl group, a propyl group, a butyl group, a pentyl group, a hexyl group, a heptyl group, an octyl group, a nonyl group, a decyl group, a dodecyl group, a tridecyl group, a tetradecyl group, a hexadecyl group, and an octadecyl group, a cycloalkyl group such as a cyclohexyl group, an alkenyl group such as a vinyl group and an allyl group, an aryl group such as a phenyl group and a tolyl group, and an arylalkenyl group such as a styryl group and an α-methylstyryl group, and examples of the substituted monovalent hydrocarbon group include a chloromethyl group, a 3-chloropropyl group, a 3,3,3-trifluoropropyl group, a cyanoethyl group, a 3-aminopropyl group, and an N-(β-aminoethyl)-γ-aminopropyl group, which are formed by substituting a part or all of hydrogen atoms bonded to the carbon atoms of the above groups with a halogen atom, a cyano group, an amino group, or the like.

In the general formula (4), x is 3 to 200, and is preferably an integer from 10 to 150 from the viewpoint of the dispersibility and anti-foaming properties of the silicone oil or silicone oil compound (E). In the general formula (4), y is 1 to 60, and is preferably an integer from 1 to 30 from the viewpoint of the dispersibility and anti-foaming properties of the silicone oil or silicone oil compound (E).

In the general formula (5), $R^4$ is a divalent hydrocarbon group having 2 to 6 carbon atoms from the viewpoint of ease of acquisition of raw materials, and specific examples thereof include an alkylene group and an alkenylene group such as an ethylene group, a propylene group, a butylene group, a pentenylene group, and a hexenylene group.

In the general formula (5), $R^5$ is a hydrogen atom or a monovalent organic group selected from the group consisting of an alkyl group having 1 to 6 carbon atoms, an acetyl group, or an isocyanate group. Examples of the alkyl group include a methyl group, an ethyl group, a propyl group, a butyl group, and a pentyl group.

In the general formula (5), a is a positive number, b is 0 or a positive number, and a and b are positive numbers that satisfy $2 \leq a+b \leq 80$, preferably $3 \leq a+b \leq 60$, and more preferably $5 \leq a+b \leq 50$. When a and b satisfy the above range, the water solubility of the silicone oil or silicone oil compound (E) is enhanced, and thus this can be more easily dispersed in the coolant composition. When below the lower limit, although at a level that does not cause problems in performance, the performance of dispersing the silicone oil or silicone oil compound (E) in the coolant composition is slightly low, and when above the upper limit, the compatibility between the silicone oil or silicone oil compound (E) and the polyether-modified silicone (F) decreases, and the performance of dispersion in the coolant composition is also slightly lowered.

In the general formula (5), a and b satisfy $b/a=0$ to 4 (0/10 to 8/2), preferably $b/a=0$ to 6/4, and more preferably $b/a=0$ to 4/6. When a and b satisfy the above range, the water solubility of the silicone oil or silicone oil compound (E) is enhanced, and thus this can be more easily dispersed in the coolant composition. In addition, the thermal durability of the anti-foaming agent and the durability of the anti-foaming effect can be improved. When above the upper limit, the performance of dispersing the silicone oil or silicone oil compound (E) in the coolant composition is deteriorated although the performance is not greatly deteriorated.

In the above general formula (4), $R^3$ is the group employed as $R^1$ or $R^2$, a hydroxyl group, or an alkoxy group having 1 to 6 carbon atoms. Examples of the alkoxy group include a methoxy group, an ethoxy group, a propoxy group, and a butoxy group.

From the viewpoint of the dispersibility and workability of the silicone oil or silicone oil compound (E), the viscosity at 25° C. of the polyether-modified silicone (F), which is measured by an Ostwald viscometer, is preferably 10 to 10,000 mm$^2$/s, more preferably 50 to 8000 mm$^2$/s, and even more preferably 200 to 5000 mm$^2$/s. One type of the polyether-modified silicone (F) may be used singly, or two or more types thereof may be used in combination.

Specific examples of the polyether-modified silicone (F) include the following compounds:

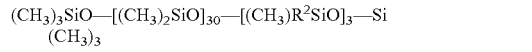

$$(CH_3)_3SiO-[(CH_3)_2SiO]_{30}-[(CH_3)R^2SiO]_3-Si(CH_3)_3$$

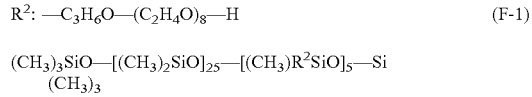

$$R^2: -C_3H_6O-(C_2H_4O)_8-H \quad (F-1)$$

$$(CH_3)_3SiO-[(CH_3)_2SiO]_{25}-[(CH_3)R^2SiO]_5-Si(CH_3)_3$$

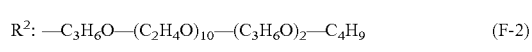

$$R^2: -C_3H_6O-(C_2H_4O)_{10}-(C_3H_6O)_2-C_4H_9 \quad (F-2)$$

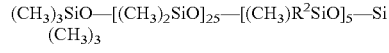

$$(CH_3)_3SiO-[(CH_3)_2SiO]_{25}-[(CH_3)R^2SiO]_5-Si(CH_3)_3$$

$$R^2: -C_3H_6O-(C_2H_4O)_8-(C_3H_6O)_{30}-C_4H_9 \quad (F-3)$$

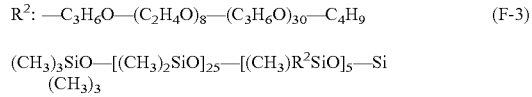

$$(CH_3)_3SiO-[(CH_3)_2SiO]_{25}-[(CH_3)R^2SiO]_5-Si(CH_3)_3$$

$$R^2: -C_3H_6O-(C_2H_4O)_{30}-(C_3H_6O)_{10}-C_4H_9 \quad (F-4)$$

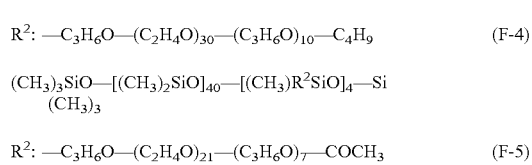

$$(CH_3)_3SiO-[(CH_3)_2SiO]_{40}-[(CH_3)R^2SiO]_4-Si(CH_3)_3$$

$$R^2: -C_3H_6O-(C_2H_4O)_{21}-(C_3H_6O)_7-COCH_3 \quad (F-5)$$

These compounds can be preferably used as the polyether-modified silicone (F) in terms of workability and excellent dispersibility of the silicone oil or silicone oil compound (E).

In the embodiment of the coolant composition of the present invention, the silicone oil (E) is not particularly limited as long as the effects of the present invention can be obtained, and those well-known may be used. Examples thereof include KF-96, KF-410, KF-412, KF-50, KF-9701, and FL-5 manufactured by Shin-Etsu Chemical Co., Ltd. Among these, KF-96 which can be easily acquired and has excellent economic feasibility is preferable. One type of these may be used singly, or two or more types thereof may be used in combination.

In the embodiment of the coolant composition of the present invention, the silicone oil compound (E) is not particularly limited as long as the effects of the present invention can be obtained, and those well-known may be used. Examples thereof include KS-66, KS-69, KS-7704 S, KS-7710, and KS-7712 manufactured by Shin-Etsu Chemical Co., Ltd. Among these, KS-66 which has excellent dispersibility, can be easily acquired, and has excellent economic feasibility is preferable. One type of these may be used singly, or two or more types thereof may be used in combination.

In the embodiment of the coolant composition of the present invention, the polyether-modified silicone (F) is not particularly limited as long as the effects of the present invention can be obtained, and those well-known may be used. Examples thereof include KF-6701, KF-351A, KF-352A, KF-353 and KF-615A manufactured by Shin-Etsu Chemical Co., Ltd. Among these, KF-6701, KF-352A, and KF-615A, which are excellent in the water dispersibility of the silicone oil or the silicone oil compound (E) and have low foaming properties, are preferable. One type of these may be used singly, or two or more types thereof may be used in combination.

In the embodiment of the coolant composition of the present invention, those containing the silicone oil compound (E) and the polyether-modified silicone (F) are not particularly limited as long as the effects of the present invention can be obtained, and those well-known may be used. Examples thereof include KS-530, KS-496A, KS-502, KS-506, KS-508, KS-537, and KS-538 manufactured by Shin-Etsu Chemical Co., Ltd. Among these, KS-530 which is excellent in dispersibility in the base (D) and is excellent in anti-foaming properties is preferable. One type of these may be used singly, or two or more types thereof may be used in combination.

In the coolant composition of the present invention, the total content of the silicone oil or silicone oil compound (E) and the polyether-modified silicone (F) is, with respect to 100 parts by mass of the coolant composition, preferably 0.05 parts by mass or more, more preferably 0.06 parts by mass or more, even more preferably 0.08 parts by mass or more, and even more preferably 0.1 parts by mass or more from the viewpoint of further improving anti-foaming properties and maintaining viscosity. The amount of the silica (C) mixed therein as the anti-foaming agent described above is also included in the above content.

From the viewpoint of maintaining a better balance between the thickening effect of the surfactant (viscosity index improver) and the anti-foaming effect, the content of the silicone oil or silicone oil compound (E) in the coolant composition of the present invention is, with respect to 100 parts by mass of the coolant composition, preferably 0.001 to 1.0 parts by mass, more preferably 0.005 to 1.0 parts by mass, and even more preferably 0.01 to 0.5 parts by mass. The amount of the silica (C) mixed therein as the anti-foaming agent described above is also included in the above content.

From the viewpoint of maintaining a better balance between the thickening effect of the surfactant (viscosity index improver) and the anti-foaming effect, the content of the polyether-modified silicone (F) in the coolant composition of the present invention is, with respect to 100 parts by mass of the coolant composition, preferably 0.001 to 10 parts by mass, more preferably 0.005 to 5.0 parts by mass, and even more preferably 0.01 to 1.0 parts by mass.

The mass ratio between the silicone oil or silicone oil compound (E) and the polyether-modified silicone (F) in the coolant composition of the present invention is preferably 9:1 to 1:9, more preferably 8:2 to 2:8, and even more preferably 7:3 to 3:7. By causing the mixing ratio to be in the above range, (1) a significant decrease in the thickening effect of the surfactant (viscosity index improver) can be further prevented, and (2) the anti-foaming effect at a high temperature can be further enhanced.

The kinematic viscosity of the coolant composition of the present invention is 8.5 mm$^2$/s or more at 25° C. and 2.0 mm$^2$/s or less at 100° C.

The kinematic viscosity at 25° C. of the coolant composition of the present invention is 8.5 mm$^2$/s or more from the viewpoint of suppressing cooling loss at a low temperature, and is preferably 3000 mm$^2$/s or less from the viewpoint of avoiding a load on a water pump and suppressing poor fuel efficiency of an internal combustion engine. From these viewpoints, the kinematic viscosity at 25° C. thereof is preferably 8.5 to 3000 mm$^2$/s, more preferably 9 to 2000 mm$^2$/s, and even more preferably 50 to 1000 mm$^2$/s.

From the viewpoint of maintaining the cooling capacity at a high temperature and preventing overheating, the kinematic viscosity at 100° C. of the coolant composition of the present invention is 2.0 mm$^2$/s or less, preferably 0.3 to 2.0 mm$^2$/s, and more preferably 0.4 to 1.8 mm$^2$/s. The cooling capacity of the coolant composition can be evaluated, for example, by measuring the thermal transmittance of a radiator. The kinematic viscosity at 100° C. of the coolant of 100% water is 0.3 mm$^2$/s.

In the coolant of the present invention, it is possible to set the kinematic viscosity to be in the predetermined range described above by including the components described above. In a case where it is desired to increase the kinematic viscosity at 25° C., this can be achieved by a method of increasing the content of a non-silicone surfactant, a method of adjusting the content of an alkali metal compound in a case of using the alkali metal compound, a method of increasing the content of alcohols in a case where a base contains the alcohols, and the like. In addition, in a case where it is desired to decrease the kinematic viscosity at 100° C., this can be achieved by a method of decreasing the content of a non-silicone surfactant, a method of adjusting the content of an alkali metal compound in a case of using the alkali metal compound, a method of decreasing the content of alcohols in a case where a base contains the alcohols, and the like.

If necessary, other additives than the components (A) to (F) described above may be mixed in the coolant composition of the present invention in a range in which the effects of the present invention are not impaired.

For example, in order to effectively suppress the corrosion of metals used in an engine coolant path, the coolant composition of the present invention may include at least one rust inhibitor in a range in which the effects of the present invention are not impaired. Examples of the rust inhibitor include any one or a mixture of two or more of phosphoric acid and/or a salt thereof, an aliphatic carboxylic acid and/or a salt thereof, an aromatic carboxylic acid and/or a salt thereof, a triazole, a thiazole, a silicate, a nitrate, a nitrite, a borate, a molybdate, and an amine salt.

For example, in order to prevent corrosion, the coolant composition of the present invention may include at least one pH adjusting agent in a range in which the effects of the present invention are not impaired. Examples of the pH adjusting agent include any one or a mixture of two or more of sodium hydroxide, potassium hydroxide, and lithium hydroxide.

The pH at 25° C. of the coolant composition of the present invention is preferably 6 or more and more preferably 7 or more, and is preferably 10 or less and more preferably 9 or less.

To the coolant composition of the present invention, for example, a coloring agent, a dye, a dispersing agent, a bittering agent, or the like may be appropriately added in ranges in which the effects of the present invention are not impaired.

The total amount of the above-mentioned other additives mixed therein is typically 10 parts by mass or less and preferably 5 parts by mass or less with respect to 100 parts by mass of the composition.

In the present invention, a production method of the coolant composition is not particularly limited as long as the effects of the present invention can be obtained, and a typical production method of a coolant composition may be used. For example, the coolant composition can be produced through uniform stirring at a low temperature. The coolant composition of the present invention is more preferably obtained by, after mixing, heating the mixture to preferably 60° C. or higher, more preferably 80° C. or higher and preferably 100° C. or lower, stirring the resultant if necessary, dissolving the resultant, and thereafter cooling the resultant to room temperature (20° C.).

The present invention also relates to an automotive engine concentrated coolant composition (hereinafter, also referred to as concentrated coolant composition of the present invention). The concentrated coolant composition of the present invention is a composition containing the components (A) to (C) of the coolant composition of the present invention, the silicone oil or silicone oil compound (E) if necessary, the polyether-modified silicone (F) if necessary, and a solvent (D') if necessary. The concentrated coolant composition of the present invention can be used for obtaining the coolant composition of the present invention by being diluted, for example, 2 to 10 times by mass with the base (D). The solvent (D') is a liquid that can be used in a typical coolant compositions such as water and glycols, and as specific examples thereof, the above description regarding the base (D) is cited. In addition, the solvent (D') may be the same as or different from the base (D). The concentrated coolant composition of the present invention can suppress foaming properties after being diluted even in a case where the non-silicone surfactant (A), the anti-foaming agent containing the mineral oil (B) and the silica (C), the silicone oil or silicone oil compound (E) and the polyether-modified silicone (F) if necessary, and the alkali metal compound (A') if necessary are concentrated beforehand. Therefore, the concentrated coolant composition can be used as the coolant composition by being diluted with the base (D) immediately before being supplied to the engine. In addition, other additives can be mixed in the concentrated coolant composition of the present invention in a range in which the effects of the present invention regarding the obtained coolant composition are not impaired. As the additives, the above description regarding the coolant composition of the present invention is cited. Furthermore, the additives may also be mixed in the solvent (D') for use.

An embodiment of the concentrated coolant composition of the present invention may include, with respect to 100 parts by mass of the concentrated coolant composition, the following components: (A) the non-silicone surfactant: 0.02 to 99.98 parts by mass; the anti-foaming agent containing (B) the mineral oil and (C) the silica: 0.02 to 20 parts by mass, preferably 0.04 to 10 parts by mass; (D') the solvent: 0 to 99.8 parts by mass; (E) the silicone oil or silicone oil compound: 0.002 to 10 parts by mass; and (F) the polyether-modified silicone: 0.002 to 90 parts by mass.

The concentrated coolant composition of the present invention may contain the alkali metal compound (A'). The content of the alkali metal compound (A') in the concentrated coolant composition of the present invention is, with respect to 100 parts by mass of the concentrated coolant composition, preferably 1 to 30 parts by mass, and more preferably 5 to 15 parts by mass.

The coolant composition of the present invention can be generally used as a coolant and is preferably used as a coolant for an internal combustion engine. Accordingly, the present invention also relates to a method of operating an internal combustion engine in which the coolant composition of the present invention is used as a coolant (hereinafter, also referred to as a method of operating an internal combustion engine of the present invention). According to the method of operating an internal combustion engine of the present invention, it is possible to greatly improve the fuel efficiency effect of the internal combustion engine. The coolant composition of the present invention can also be used as a coolant for a battery stack, a fuel cell stack, or the like.

Hereinafter, the present invention will be described in more detail using examples, but the present invention is not limited to these examples. In addition, numerical values in the formulation represent parts by mass.

[1. Preparation of LLC]

Materials of the formulation shown in Table 1 below were added, stirred, and mixed together, thereby producing an LLC. In Table 1, sebacic acid manufactured by Kokura Synthetic Industries, ltd. as a rust inhibitor, and caustic potash manufactured by Osaka Soda Co., Ltd. as a pH adjusting agent were used.

TABLE 1

| Material | Mixing amount (parts by mass) |
|---|---|
| Ethylene glycol | 90.6 |
| Water | 1.2 |
| Rust inhibitor | 4.2 |
| pH adjusting agent | 4 |

Examples 1 to 7 and Comparative Examples 1 to 13

A silicone anti-foaming agent or anti-foaming agent described in Tables 2-1 to 2-3 below, a polyoxyethylene alkyl ether sulfuric acid ester salt ($R^c$ in the formula (2) is a linear alkyl group having 22 carbon atoms, $R^d$ is ethylene group, q is 4, and M is sodium) as a non-silicone surfactant (A) (viscosity index improver), and water were mixed in the LLC at mixing amounts (parts by mass) described in Tables 2-1 to 2-3 so that the total amount thereof reached 100 parts by mass, thereby producing coolant compositions of Examples 1 to 7 and coolant compositions of Comparative Examples 1 to 13. There, the polyoxyethylene alkyl ether sulfuric acid ester salt was synthesized as follows.

<Synthesis Method of Polyoxyethylene Alkyl Ether Sulfuric Acid Ester Salt>

Using a thin-film sulfation reactor having an outer jacket, an alcohol ethoxylate (the average number of moles of ethylene oxide added was 4.0) of a higher alcohol primarily containing 22 carbon atoms (trade name: KALCOL 220-80 manufactured by Kao corporation) was caused to flow down in a thin film form at a supply rate of 5.0 L/h, and sulfur trioxide gas diluted with dry air (concentration of sulfur trioxide gas: 1.1 vol %) was added under conditions of a reactor cooling temperature of 40° C. and a supply rate of 130 L/min (molar ratio of sulfur trioxide/ethoxylate: 1.00) to carry out a sulfation reaction.

The obtained polyoxyethylene alkyl ether sulfate was neutralized by a 2.5% sodium hydroxide aqueous solution (molar ratio of sodium hydroxide/polyoxyethylene alkyl ether sulfuric acid ester: 1.10) so as to cause the concentration of polyoxyethylene ether sodium sulfate to be 23% or more and 27% or less such that polyoxyethylene alkyl ether sodium sulfate having 22 carbon atoms (the average number of moles of ethylene oxide added was 4.0) was synthesized.

<Evaluation Tests>

The obtained coolant compositions were subjected to the following evaluation tests.

<1. Test of Effect on Viscosity Index>

The kinematic viscosity at 25° C. was measured according to JIS K 2283. A case where the kinematic viscosity at 25° C. of the coolant composition was 8.5 $mm^2$/s or more was evaluated as good.

<2. Test of Effect on Viscosity Index>

The kinematic viscosity at 100° C. was measured according to JIS K 2283. A case where the kinematic viscosity at 100° C. of the coolant composition was 2.0 $mm^2$/s or less was evaluated as good.

<3. Evaluation Test of Anti-Foaming Properties at High Temperature>

The foamability test of JIS K 2234 was conducted without dilution at a liquid temperature of 90° C., and a case where the volume of foam was 4 mL or less was evaluated as "good".

<4. Durability Test>

After conducting a durability test (100° C.×500 hours), an evaluation test of anti-foaming properties at a high temperature of <3> described above was conducted, and a case where the volume of foam was 4 mL or less was evaluated as "good". The results are shown in Tables 2-1 to 2-3 below.

TABLE 2-1

| | | | | Example 1 | Example 2 | Example 3 | Example 4 |
|---|---|---|---|---|---|---|---|
| Composition | LLC | | | 52 | 52 | 52 | 52 |
| | Water | | | 47.4 | 47 | 47.4 | 47 |
| | Viscosity index improver | manufactured by Kao Corporation | Polyoxyethylene alkyl ether sulfuric acid ester salt | 0.5 | 0.5 | 0.5 | 0.5 |
| | Anti-foaming agent | SN-DEFOAMER VL manufactured by SAN NOPCO LIMITED | Mineral oil (45%) + silica (3%) | 0.1 | 0.5 | | |
| | | SN-DEFOAMER 777 manufactured by SAN NOPCO LIMITED | Mineral oil (22%) + silica (4%) | | | 0.1 | 0.5 |
| | | KS-530 manufactured by Shin-Etsu Chemical Co., Ltd. | Silicone oil compound + PE-modified silicone | | | | |
| | | Mixing silicone oil KF-96 (1000 cS) manufactured by Shin-Etsu Chemical Co., Ltd., with PE-modified silicone KF-6701 manufactured by Shin-Etsu Chemical Co., Ltd. in 4:6 | Silicone oil + PE-modified silicone | | | | |
| | | NOPCO 267-A manufactured by SAN NOPCO LIMITED | Mineral oil (83%) | | | | |
| | | SN-DEFOAMER 1341 manufactured by SAN NOPCO LIMITED | Mineral oil (78%) + polyethylene wax + silica (1%) | | | | |
| | | SN-DEFOAMER 479 manufactured by SAN NOPCO LIMITED | Mineral oil (89%) + higher fatty acid amide | | | | |
| | | SURFYNOL SE-F manufactured by Nissin Chemical Co., Ltd. | PEG added acetylenic diol (75%) | | | | |
| | | Degressal SD 40 manufactured by BASF | Phosphoric acid ester-based (100%) | | | | |
| | | AEROSIL R972 manufactured by EVONIK | Silica | | | | |
| | Mineral oil proportion | | | 0.045 | 0.225 | 0.022 | 0.11 |
| | Silica proportion | | | 0.003 | 0.015 | 0.004 | 0.02 |
| | Evaluation | A foam volume of 4 mL or less at a high temperature was evaluated as good | | 3 | 0 | 3 | 0 |
| | | A foam volume of 4 mL or less at a high temperature after durability test (100° C. × 500 h) was evaluated as good | | 4 | 2 | 4 | 2 |

TABLE 2-1-continued

|  |  |  |  |  |  |  |
|---|---|---|---|---|---|---|
| A kinematic viscosity (mm²/s) of 8.5 or more at 25° C. was evaluated as good | | | 83 | 29 | ≥100 | 54 |
| A kinematic viscosity (mm²/s) of 2 or less at 100° C. was evaluated as good | | | 0.80 | 0.79 | 0.82 | 0.79 |

| | | | | Example 5 | Example 6 | Example 7 |
|---|---|---|---|---|---|---|
| Composition | LLC | | | 52 | 52 | 52 |
| | Water | | | 47.35 | 46.85 | 47.1 |
| | Viscosity index improver | manufactured by Kao Corporation | Polyoxyethylene alkyl ether sulfuric acid ester salt | 0.5 | 0.5 | 0.5 |
| | Anti-foaming agent | SN-DEFOAMER VL manufactured by SAN NOPCO LIMITED | Mineral oil (45%) + silica (3%) | 0.1 | 0.5 | |
| | | SN-DEFOAMER 777 manufactured by SAN NOPCO LIMITED | Mineral oil (22%) + silica (4%) | | | 0.2 |
| | | KS-530 manufactured by Shin-Etsu Chemical Co., Ltd. | Silicone oil compound + PE-modified silicone | 0.05 | | |
| | | Mixing silicone oil KF-96 (1000 cS) manufactured by Shin-Etsu Chemical Co., Ltd., with PE-modified silicone KF-6701 manufactured by Shin-Etsu Chemical Co., Ltd. in 4:6 | Silicone oil + PE-modified silicone | | 0.15 | 0.1 |
| | | NOPCO 267-A manufactured by SAN NOPCO LIMITED | Mineral oil (83%) | | | |
| | | SN-DEFOAMER 1341 manufactured by SAN NOPCO LIMITED | Mineral oil (78%) + polyethylene wax + silica (1%) | | | |
| | | SN-DEFOAMER 479 manufactured by SAN NOPCO LIMITED | Mineral oil (89%) + higher fatty acid amide | | | |
| | | SURFYNOL SE-F manufactured by Nissin Chemical Co., Ltd. | PEG added acetylenic diol (75%) | | | |
| | | Degressal SD 40 manufactured by BASF | Phosphoric acid ester-based (100%) | | | |
| | | AEROSIL R972 manufactured by EVONIK | Silica | | | |
| Mineral oil proportion | | | | 0.045 | 0.225 | 0.066 |
| Silica proportion | | | | 0.003 | 0.015 | 0.008 |
| Evaluation | A foam volume of 4 mL or less at a high temperature was evaluated as good | | | 0 | 0 | 0 |
| | A foam volume of 4 mL or less at a high temperature after durability test (100° C. × 500 h) was evaluated as good | | | 2 | 2 | 2 |
| | A kinematic viscosity (mm²/s) of 8.5 or more at 25° C. was evaluated as good | | | ≥100 | 32 | 73 |
| | A kinematic viscosity (mm²/s) of 2 or less at 100° C. was evaluated as good | | | 0.80 | 0.79 | 0.81 |

TABLE 2-2

| | | | | Comparative Example 1 | Comparative Example 2 | Comparative Example 3 | Comparative Example 4 |
|---|---|---|---|---|---|---|---|
| Composition | LLC | | | 52 | 52 | 52 | 52 |
| | Water | | | 48 | 47.5 | 46.5 | 47.46 |
| | Viscosity index improver | manufactured by Kao Corporation | Polyoxyethylene alkyl ether sulfuric acid ester salt | | 0.5 | 0.5 | 0.5 |
| | Anti-foaming agent | SN-DEFOAMER VL manufactured by SAN NOPCO LIMITED | Mineral oil (45%) + silica (3%) | | | 1 | |
| | | SN-DEFOAMER 777 manufactured by SAN NOPCO LIMITED | Mineral oil (22%) + silica (4%) | | | | 0.04 |
| | | KS-530 manufactured by Shin-Etsu Chemical Co., Ltd. | Silicone oil compound + PE-modified silicone | | | | |
| | | Mixing silicone oil KF-96 (1000 cS) manufactured by Shin-Etsu Chemical Co., Ltd., with PE-modified silicone KF-6701 manufactured by Shin-Etsu Chemical Co., Ltd. in 4:6 | Silicone oil + PE-modified silicone | | | | |
| | | NOPCO 267-A manufactured by SAN NOPCO LIMITED | Mineral oil (83%) | | | | |
| | | SN-DEFOAMER 1341 manufactured by SAN NOPCO LIMITED | Mineral oil (78%) + polyethylene wax + silica (1%) | | | | |
| | | SN-DEFOAMER 479 manufactured by SAN NOPCO LIMITED | Mineral oil (89%) + higher fatty acid amide | | | | |

TABLE 2-2-continued

| | | | | | | |
|---|---|---|---|---|---|---|
| | SURFYNOL SE-F manufactured by Nissin Chemical Co., Ltd. | PEG added acetylenic diol (75%) | | | | |
| | Degressal SD 40 manufactured by BASF | Phosphoric acid ester-based (100%) | | | | |
| | AEROSIL R972 manufactured by EVONIK | Silica | | | | |
| Mineral oil proportion | | | 0 | 0 | 0.45 | 0.0088 |
| Silica proportion | | | 0 | 0 | 0.03 | 0.0016 |
| Evaluation | A foam volume of 4 mL or less at a high temperature was evaluated as good | | 0 | ≥50 | 0 | ≥50 |
| | A foam volume of 4 mL or less at a high temperature after durability test (100° C. × 500 h) was evaluated as good | | 0 | — | 0 | — |
| | A kinematic viscosity (mm²/s) of 8.5 or more at 25° C. was evaluated as good | | 3 | ≥100 | 8 | ≥100 |
| | A kinematic viscosity (mm²/s) of 2 or less at 100° C. was evaluated as good | | 0.73 | 0.89 | 0.79 | 0.86 |

| | | | | Comparative Example 5 | Comparative Example 6 | Comparative Example 7 |
|---|---|---|---|---|---|---|
| Composition | LLC | | | 52 | 52 | 52 |
| | Water | | | 47.2 | 47.4 | 47.4 |
| | Viscosity index improver | manufactured by Kao Corporation | Polyoxyethylene alkyl ether sulfuric acid ester salt | 0.5 | 0.5 | 0.5 |
| | Anti-foaming agent | SN-DEFOAMER VL manufactured by SAN NOPCO LIMITED | Mineral oil (45%) + silica (3%) | 0.2 | | |
| | | SN-DEFOAMER 777 manufactured by SAN NOPCO LIMITED | Mineral oil (22%) + silica (4%) | | | |
| | | KS-530 manufactured by Shin-Etsu Chemical Co., Ltd. | Silicone oil compound + PE-modified silicone | | | |
| | | Mixing silicone oil KF-96 (1000 cS) manufactured by Shin-Etsu Chemical Co., Ltd., with PE-modified silicone KF-6701 manufactured by Shin-Etsu Chemical Co., Ltd. in 4:6 | Silicone oil + PE-modified silicone | | | 0.1 |
| | | NOPCO 267-A manufactured by SAN NOPCO LIMITED | Mineral oil (83%) | | 0.1 | |
| | | SN-DEFOAMER 1341 manufactured by SAN NOPCO LIMITED | Mineral oil (78%) + polyethylene wax + silica (1%) | | | |
| | | SN-DEFOAMER 479 manufactured by SAN NOPCO LIMITED | Mineral oil (89%) + higher fatty acid amide | | | |
| | | SURFYNOL SE-F manufactured by Nissin Chemical Co., Ltd. | PEG added acetylenic diol (75%) | | | |
| | | Degressal SD 40 manufactured by BASF | Phosphoric acid ester-based (100%) | | | |
| | | AEROSIL R972 manufactured by EVONIK | Silica | 0.1 | | |
| Mineral oil proportion | | | | 0.09 | 0.083 | 0 |
| Silica proportion | | | | 0.106 | 0 | 0 |
| Evaluation | A foam volume of 4 mL or less at a high temperature was evaluated as good | | | Silica agglomeration | 8 | 15 |
| | A foam volume of 4 mL or less at a high temperature after durability test (100° C. × 500 h) was evaluated as good | | | | — | — |
| | A kinematic viscosity (mm²/s) of 8.5 or more at 25° C. was evaluated as good | | | 67 | 64 | ≥100 |
| | A kinematic viscosity (mm²/s) of 2 or less at 100° C. was evaluated as good | | | — | 0.80 | 0.86 |

TABLE 2-3

| | | | | Comparative Example 8 | Comparative Example 9 | Comparative Example 10 |
|---|---|---|---|---|---|---|
| Composition | LLC | | | 52 | 52 | 52 |
| | Water | | | 47.4 | 47.4 | 47 |
| | Viscosity index improver | manufactured by Kao Corporation | Polyoxyethylene alkyl ether sulfuric acid ester salt | 0.5 | 0.5 | 0.5 |
| | Anti-foaming agent | SN-DEFOAMER VL manufactured by SAN NOPCO LIMITED | Mineral oil (45%) + silica (3%) | | | |
| | | SN-DEFOAMER 777 manufactured by SAN NOPCO LIMITED | Mineral oil (22%) + silica (4%) | | | |
| | | KS-530 manufactured by Shin-Etsu Chemical Co., Ltd. | Silicone oil compound + PE-modified silicone | | | |
| | | Mixing silicone oil | Silicone oil + PE-modified | | | |

TABLE 2-3-continued

| | | | | | |
|---|---|---|---|---|---|
| | KF-96 (1000 cS) manufactured by Shin-Etsu Chemical Co., Ltd., with PE-modified silicone KF-6701 manufactured by Shin-Etsu Chemical Co., Ltd. in 4:6 | silicone | | | |
| | NOPCO 267-A manufactured by SAN NOPCO LIMITED | Mineral oil (83%) | | | |
| | SN-DEFOAMER 1341 manufactured by SAN NOPCO LIMITED | Mineral oil (78%) + polyethylene wax + silica (1%) | 0.1 | | |
| | SN-DEFOAMER 479 manufactured by SAN NOPCO LIMITED | Mineral oil (89%) + higher fatty acid amide | | 0.1 | |
| | SURFYNOL SE-F manufactured by Nissin Chemical Co., Ltd. | PEG added acetylenic diol (75%) | | | 0.5 |
| | Degressal SD 40 manufactured by BASF | Phosphoric acid ester-based (100%) | | | |
| | AEROSIL R972 manufactured by EVONIK | Silica | | | |
| Mineral oil proportion | | | 0.078 | 0.089 | 0 |
| Silica proportion | | | 0.001 | 0 | 0 |
| Evaluation | A foam volume of 4 mL or less at a high temperature was evaluated as good | | United with wax | United with higher fatty acid amide | 0 |
| | A foam volume of 4 mL or less at a high temperature after durability test (100° C. × 500 h) was evaluated as good | | | | 25 |
| | A kinematic viscosity (mm²/s) of 8.5 or more at 25° C. was evaluated as good | | 60 | 85 | 14 |
| | A kinematic viscosity (mm²/s) of 2 or less at 100° C. was evaluated as good | | 0.81 | 0.81 | 0.79 |

| | | | Comparative Example 11 | Comparative Example 12 | Comparative Example 13 |
|---|---|---|---|---|---|
| Composition | LLC | | 52 | 52 | 52 |
| | Water | | 46.7 | 47.3 | 47.1 |
| | Viscosity index improver | manufactured by Kao Corporation | Polyoxyethylene alkyl ether sulfuric acid ester salt | 0.5 | 0.5 | 0.5 |
| | Anti-foaming agent | SN-DEFOAMER VL manufactured by SAN NOPCO LIMITED | Mineral oil (45%) + silica (3%) | | | |
| | | SN-DEFOAMER 777 manufactured by SAN NOPCO LIMITED | Mineral oil (22%) + silica (4%) | | | |
| | | KS-530 manufactured by Shin-Etsu Chemical Co., Ltd. | Silicone oil compound + PE-modified silicone | | | |
| | | Mixing silicone oil | Silicone oil + PE-modified silicone | | | |
| | | KF-96 (1000 cS) manufactured by Shin-Etsu Chemical Co., Ltd., with PE-modified silicone KF-6701 manufactured by Shin-Etsu Chemical Co., Ltd. in 4:6 | | | | |
| | | NOPCO 267-A manufactured by SAN NOPCO LIMITED | Mineral oil (83%) | | 0.1 | 0.1 |
| | | SN-DEFOAMER 1341 manufactured by SAN NOPCO LIMITED | Mineral oil (78%) + polyethylene wax + silica (1%) | | | |
| | | SN-DEFOAMER 479 manufactured by SAN NOPCO LIMITED | Mineral oil (89%) + higher fatty acid amide | | | |
| | | SURFYNOL SE-F manufactured by Nissin Chemical Co., Ltd. | PEG added acetylenic diol (75%) | | 0.1 | 0.3 |
| | | Degressal SD 40 manufactured by BASF | Phosphoric acid ester-based (100%) | 0.8 | | |
| | | AEROSIL R972 manufactured by EVONIK | Silica | | | |
| Mineral oil proportion | | | | 0 | 0.08 | 0.08 |
| Silica proportion | | | | 0 | 0.00 | 0.00 |
| Evaluation | A foam volume of 4 mL or less at a high temperature was evaluated as good | | | Poor separation | 6 | 3 |
| | A foam volume of 4 mL or less at a high temperature after durability test (100° C. × 500 h) was evaluated as good | | | | 18 | 12 |
| | A kinematic viscosity (mm²/s) of 8.5 or more at 25° C. was evaluated as good | | | | 23 | 17 |
| | A kinematic viscosity (mm²/s) of 2 or less at 100° C. was evaluated as good | | | 0.79 | 0.79 | 0.79 |

From Tables 2-1 to 2-3, it could be seen that in the coolant compositions of Examples 1 to 7 in which the non-silicone surfactant (A), the anti-foaming agent containing specific amounts of the mineral oil (B) and the silica (C), and the base (D) were contained, desired kinematic viscosities were achieved at a low temperature and a high temperature, the foaming properties of the surfactant at a high temperature were suppressed, anti-foaming properties were maintained for a long period of time under a high temperature environment, and durability was achieved.

The coolant composition of the present invention is suitably used for cooling an internal combustion engine, particularly an automotive engine, an inverter, a battery, and the like.

The invention claimed is:

1. An automotive engine coolant composition comprising:
   a non-silicone surfactant comprising a polyoxyethylene alkyl ether sulfuric acid ester salt having 16 to 24 carbon atoms in the alkyl group, an alkyl phosphoric acid ester salt, or a polyoxyethylene alkyl ether phosphoric acid ester salt;
   an anti-foaming agent containing a mineral oil and silica; and
   a base, wherein
   the base includes at least water or an alcohol selected from the group consisting of a monohydric alcohol, a dihydric alcohol, a trihydric alcohol, and a glycol monoalkyl ether,
   the coolant composition has a kinematic viscosity being 8.5 mm$^2$/s or more at 25° C. and 2.0 mm$^2$/s or less at 100° C., and
   with respect to 100 parts by mass of the coolant composition, a content of the mineral oil is 0.01 to 0.4 parts by mass, and a content of the silica is 0.003 to 0.1 parts by mass.

2. The automotive engine coolant composition according to claim 1, further comprising:
   a silicone oil or silicone oil compound; and
   a polyether-modified silicone.

3. The automotive engine coolant composition according to claim 2, wherein
   with respect to 100 parts by mass of the coolant composition, a total content of the silicone oil or silicone oil compound and the polyether-modified silicone is 0.05 parts by mass or more.

4. The automotive engine coolant composition according to claim 2, wherein
   a content of the silicone oil or silicone oil compound is 0.001 to 1 parts by mass with respect to 100 parts by mass of the coolant composition, and
   a content of the polyether-modified silicone is 0.001 to 10 parts by mass with respect to 100 parts by mass of the coolant composition.

5. The automotive engine coolant composition according to claim 2, wherein
   a mass ratio between the silicone oil or silicone oil compound and the polyether-modified silicone is from 9:1 to 1:9.

6. A method of operating an internal combustion engine comprising cooling the internal combustion engine by employing the coolant composition according to claim 1.

7. An automotive engine concentrated coolant composition comprising,
   with respect to 100 parts by mass of the concentrated coolant composition, 0.02 to 99.976 parts by mass of a non-silicone surfactant; 0.02 to 20 parts by mass of an anti-foaming agent containing a mineral oil and silica; 0 to 99.8 parts by mass of a solvent; 0.002 to 10 parts by mass of a silicone oil or silicone oil compound; and 0.002 to 90 parts by mass of a polyether-modified silicone,
   wherein the non-silicone surfactant comprises a polyoxyethylene alkyl ether sulfuric acid ester salt having 16 to 24 carbon atoms in the alkyl group, an alkyl phosphoric acid ester salt, or a polyoxyethylene alkyl ether phosphoric acid ester salt.

8. An automotive engine coolant composition comprising the automotive engine concentrated coolant composition of claim 7, diluted 2 to 10 times by mass with a base including at least water or an alcohol selected from the group consisting of a monohydric alcohol, a dihydric alcohol, a trihydric alcohol, and a glycol monoalkyl ether, wherein the solvent may be the same as or different from the base.

* * * * *